(12) United States Patent
Kirsch (10) Patent No.: US 10,536,776 B2
(45) Date of Patent: Jan. 14, 2020

(54) EARPHONES WITH BIMODALLY FITTING EARBUDS AND BASS PRESERVATION CAPABILITIES

(71) Applicant: Harman International Industries, Incorporated, Stramford, CT (US)

(72) Inventor: James M. Kirsch, Salt Lake City, UT (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 0 days.

(21) Appl. No.: 14/846,725

(22) Filed: Sep. 4, 2015

(65) Prior Publication Data

US 2017/0070819 A1    Mar. 9, 2017

(51) Int. Cl.
| | |
|---|---|
| *H04R 3/12* | (2006.01) |
| *H04L 1/24* | (2006.01) |
| *H04R 1/10* | (2006.01) |
| *H04R 1/22* | (2006.01) |

(52) U.S. Cl.
CPC ............ *H04R 3/12* (2013.01); *H04L 1/24* (2013.01); *H04R 1/1016* (2013.01); *H04R 1/1083* (2013.01); *H04R 1/22* (2013.01); *H04R 2430/01* (2013.01); *H04R 2430/03* (2013.01); *H04R 2460/05* (2013.01); *H04R 2460/09* (2013.01)

(58) Field of Classification Search
CPC ...... H04R 3/12; H04R 1/1016; H04R 1/1083; H04R 1/22; H04R 2430/01; H04R 2430/03; H04R 2460/05; H04R 2460/09
See application file for complete search history.

(56) References Cited

U.S. PATENT DOCUMENTS

| | | | |
|---|---|---|---|
| 5,412,733 A | * | 5/1995 | Nagayoshi ............... H04R 3/04 381/74 |
| 6,549,635 B1 | | 4/2003 | Gebert |
| 8,401,200 B2 | | 3/2013 | Tiscareno et al. |
| 8,750,527 B2 | | 6/2014 | Tiscareno et al. |

(Continued)

OTHER PUBLICATIONS

International Search Report Application No. PCT/IB2016/054794, dated Nov. 23, 2016, 12 pages.

*Primary Examiner* — April Y Blair
*Assistant Examiner* — Sazzad Hossain
(74) *Attorney, Agent, or Firm* — Artegis Law Group, LLP (57) ABSTRACT

In one embodiment, earphones with bimodally fitting earbuds enable accurate reproduction of music while exposing a wearer to environmental noises on one side of the wearer. More specifically, an open earbud is designed to create a substantially open (i.e., unsealed) sound chamber around one ear while a closed earbud is designed to create a substantially closed sound chamber around the other ear. Because the open earbud is associated with sound leakage that alters both the intended level and the bass content of the music, the earphones include a signal redistribution subsystem that perspicaciously replaces at least a portion of this lost signal energy. Advantageously, such earphones expose the wearer to useful localized sounds, such as noises from an auto lane adjacent to a bike lane, while conveying the intended mix of music more accurately than conventional earphones with two open earbuds.

19 Claims, 5 Drawing Sheets

(56) References Cited

U.S. PATENT DOCUMENTS

| | | | |
|---|---|---|---|
| 2010/0008528 A1* | 1/2010 | Isvan | H04R 1/1091 |
| | | | 381/337 |
| 2011/0222701 A1* | 9/2011 | Donaldson | H04R 1/1083 |
| | | | 381/74 |
| 2011/0261971 A1 | 10/2011 | Miseki et al. | |
| 2012/0087507 A1* | 4/2012 | Meyer | H04R 27/00 |
| | | | 381/56 |
| 2012/0087511 A1* | 4/2012 | Lumsden | H04R 1/1016 |
| | | | 381/74 |
| 2012/0207320 A1* | 8/2012 | Avital | H04R 1/1041 |
| | | | 381/74 |
| 2014/0169579 A1* | 6/2014 | Azmi | G10K 11/16 |
| | | | 381/71.6 |
| 2016/0057525 A1* | 2/2016 | Kappus | H04R 1/00 |
| | | | 381/74 |

* cited by examiner

EARPHONES WITH BIMODALLY FITTING EARBUDS AND BASS PRESERVATION CAPABILITIES

BACKGROUND

Field of the Various Embodiments

The various embodiments relate generally to acoustics technology and, more specifically, to earphones with bimodally fitting earbuds and bass preservation capabilities.

Description of the Related Art

Users of a variety of listening and communications systems employ personal hearing devices to experience transmitted music and other desired sounds. For example, to listen to recorded music transmitted via MP3 players, CD players, streaming audio players, etc., users may wear wired or wireless earphones that include two earbuds. Each earbud includes a speaker that transmits sounds targeted toward an ear of the user. In operation, the user places each earbud proximate to or within an ear—the left earbud forming a sound chamber around the left ear, and the right earbud forming a sound chamber around the right ear. Subsequently, the earphones deliver sounds directly to the ears of the user via the earbuds. Notably, the design of the earbuds (e.g., the shape of the eartips, the number and type of vents included in the earbuds, etc.) defines the acoustical characteristics of the earbuds, such as the quality of the transmitted sound.

To optimize the quality of the listening experience, some earphones include earbuds that provide a "closed" fit with the ears of the user. When these types of earphones are worn by a user, each of the earbuds creates a relatively sealed sound chamber relative to the ear of the user that minimizes the amount of sound leaked to the external environment during operation. However, while sealed earbuds deliver sound to the user without excessive sound degradation due to leakage, sealed earbuds also isolate the user from important environmental sounds, such as traffic noise, alerts, speech, etc.

To allow users to hear environmental sounds when wearing earphones, other earphones provide an "open" fit with the ears of the user. When these types of earphones are worn by a user, neither of the earbuds creates a sealed sound chamber and, consequently, the earphones provide acoustic transparency that enable the user to hear sounds from the outside environment during operation. However, a major drawback of open earphones is the amount of sound lost to leakage into the environment during operation. In particular, the bass content of the transmitted sound may be significantly attenuated.

In general, both earphones with closed earbuds and earphones with open earbuds have advantages and disadvantages depending on the particular task being performed by the user. Consequently, users are forced to select earphones that optimize a given aspect of the listening experience at the expense of another aspect of the listening experience. For example, to increase the quality of the sound transmitted by the earphones, a user may resort to wearing earphones with closed earbuds in a situation where the isolation caused by closed earbuds is unsafe. Alternatively, to maximize safety, a user may choose to wear earphones with open earbuds, thereby sacrificing quality of the sound transmitted by the earphones.

As the foregoing illustrates, what is needed in the art are more effective techniques for transmitting sound to users via earphones.

SUMMARY

One embodiment sets forth an audio device. The audio device includes a first earbud configured to create a substantially open sound chamber around a first ear of a user; a second earbud configured to create a substantially closed sound chamber around a second ear of the user; and a signal redistribution subsystem that is coupled to both the first earbud and the second earbud and configured to perform one or more compensation operations on a first audio input signal that is targeted for output via the first earbud, where the one or more compensation operations produce a compensated signal that mitigates sound leakage associated with the substantially open sound chamber.

Further embodiments provide, among other things, a computer-implemented method and a non-transitory computer-readable medium configured to implement the system set forth above.

At least one advantage of the disclosed audio device is that it enables an optimized listening experience. More specifically, by leveraging both an open earbud and a closed earbud included in audio device, the audio device enables tradeoffs between sound quality and environmental isolation that are not supported by conventional earphones. In particular, a signal redistribution subsystem included in the audio device may configure the audio device to provide exposure to important environmental sounds, such as traffic noise, while preserving bass frequencies.

BRIEF DESCRIPTION OF THE DRAWINGS

So that the manner in which the above recited features of the various embodiments can be understood in detail, a more particular, briefly summarized above, may be had by reference to embodiments, some of which are illustrated in the appended drawings. It is to be noted, however, that the appended drawings illustrate only typical embodiments and are therefore not to be considered limiting of scope, for the various embodiments may admit to other equally effective embodiments.

DETAILED DESCRIPTION

In the following description, numerous specific details are set forth to provide a more thorough understanding of the various embodiments. However, it will be apparent to one of skill in the art that the various embodiments may be practiced without one or more of these specific details.

Overview of Earphone System

Figure 1:
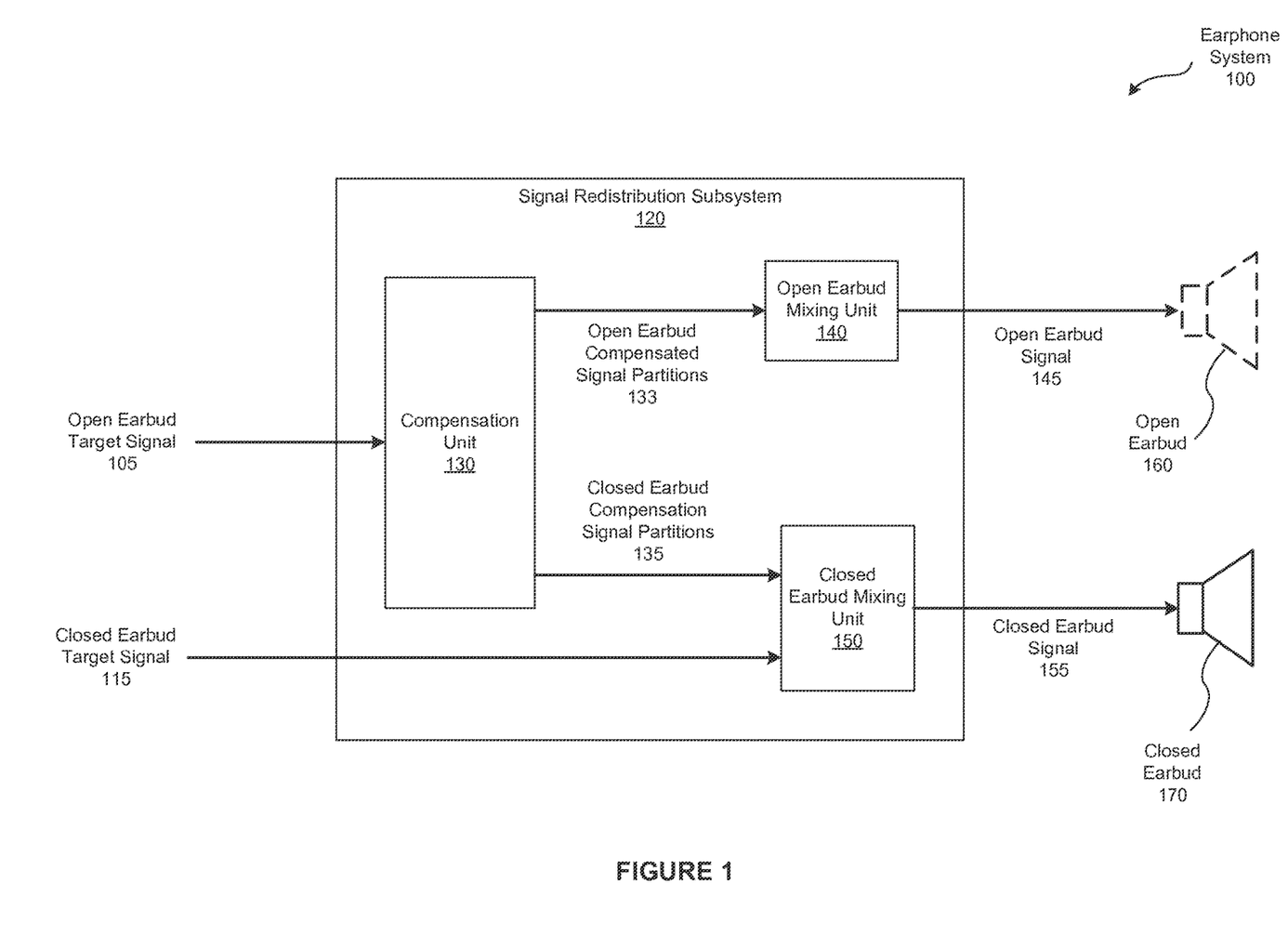
FIG. 1 illustrates an earphone system configured to implement one or more aspects of the various embodiments.

FIG. 1 illustrates an earphone system 100 configured to implement one or more aspects of the various embodiments. As shown, the earphone system 100 includes, without limitation, a closed earbud 170, an open earbud 160, and a signal redistribution subsystem 120. In alternate embodiments, without limitation, the earphone system 100 may include other types of sensory equipment, such as a microphone, and/or control devices (e.g., a volume control).

In some embodiments, without limitation, the earphone system 100 may be implemented as integrated earphones. In some such embodiments, the signal redistribution subsystem 120 may be embedded in or mounted on the closed earbud 170, the open earbud 160, or on a physical connection (e.g., a plastic headband) between the closed earbud 170 and the open earbud 160. In other embodiments, without limitation, the earphone system 100 may be implemented as earphones that include the closed earbud 170 and the open earbud 160, and the earphone system 100 may be driven by an independently deployed signal redistribution subsystem 120. For example, and without limitation, the signal redistribution subsystem 120 could be implemented in a computer system included in a smartphone that communicates with the closed earbud 170 and the open earbud 160 using any wired or wireless communication protocol.

The closed earbud 170 includes a miniature speaker that converts a closed earbud signal 155 to sound. When worn correctly by the user, the closed earbud 170 forms a relatively sealed sound chamber in the ear of the user. In general, the correct usage of the closed earbud 170 depends on the design of the closed earbud 170. For example, and without limitation, in some embodiments, the closed earbud 170 is designed to be inserted into an ear canal. The closed earbud 170 may be manufactured in any technically feasible fashion, such as including an ear tip with form fitting material that adjusts to the contours of the ear canal.

In general, the physical characteristics of the closed earbud 170, including providing a sealed acoustic chamber and close fit via the ear tip, enable the closed earbud 170 to deliver relatively high sound quality. Further, these physical characteristics also substantially isolate the associated ear of the user from ambient sounds, such as distracting conversations, traffic noises, construction sounds, etc. While such sound isolation is acceptable and/or desirable in some circumstances, in other situations it is desirable to hear such ambient sounds. For example, and without limitation, for safety reasons, a bicyclist or a pedestrian travelling on a busy road may desire to hear traffic noises.

For this reason, the earphone system 100 also includes the open earbud 160. The open earbud 160 enables the user to hear sounds on one side of the user. For example, and without limitation, if a bicyclist travelling on the right side of the road in the United States were to insert the closed earbud 170 in their right ear and the open earbud 160 in their left ear, then the bicyclist would be able to hear the traffic noises of the cars travelling adjacent to (i.e., on the left hand side of) the bicyclist.

Analogously to the closed earbud 170, the open earbud 160 contains a miniature speaker that converts an open earbud signal 145 to sound. However, in contrast to the closed earbud 170, when worn correctly by the user, the open earbud 160 permits ambient sound to leak through to the ear. For example, and without limitation, in some embodiments the open earbud 160 may include an ear tip that is shaped to provide a relatively loose fit around an ear of the user and/or may include vents that support audio transparency.

Since the open earbud 160 does not provide a tight audio seal, the open earbud 160 allows sound to leak outwards (away from the ear). Consequently, the sound received by the user via the open earbud 160 is typically degraded relative to a prototypical sound that is specified by the open earbud signal 145. More specifically, signal energy is lost before the sound is received by the user via the open earbud 160, undesirably altering the level (i.e., volume) and mix from the intended sound as specified by the open earbud signal 145. In general, the lower the frequency of the component included in the open earbud signal 145, the greater the attenuation of the open earbud signal 145. As a result, the open earbud 160 often unacceptably weakens the bass components of the open earbud signal 145.

To compensate for the signal energy lost via the open earbud 160, the earphone system 100 includes the signal redistribution subsystem 120. In operation, the signal redistribution subsystem 120 receives two signals: an open earbud target signal 105 and a closed earbud target signal 115. The open earbud target signal 105 and the closed earbud target signal 115 may be generated in any technically feasible fashion. For example, an MP3 player may transmit the open earbud target signal 105 and the closed earbud target signal 115 to the earphone system 100.

Ideally, when translated to sound and transmitted without noticeably signal energy loss to the ears of the user, the open earbud target signal 105 and the closed earbud target signal 115 provide an overall "target" listening experience. In some embodiments, without limitation, a monophonic target listening experience may be specified. In such embodiments, without limitation, the open earbud target signal 105 and the closed earbud target signal 115 may be replaced with a single target signal that is intended to be received by both ears of the user. In other embodiments, without limitation, a stereo target listening experience may be specified—the content of the open earbud target signal 105 and the closed earbud target signal 115 differ.

In a stereo target listening experience, the desired sounds may be allocated between the open earbud 160 and the closed earbud 170 in any technically feasible fashion. For example, in some embodiments, without limitation, the open earbud target signal 105 may include vocal sounds but not instrumental sounds and the closed earbud target signal 115 may include instrumental sounds but not vocal sounds. In other embodiments, without limitation, signal components may be distributed (i.e., panned) between the open earbud target signal 105 and the closed earbud target signal 115 to provide "hints" regarding the location of the source of the sound (i.e., footsteps to the left of the user).

Because an "optimized" listening experience may entail preserving the distribution of the sounds between the ears, minimizing the sound energy loss via the open earbud 160, or any combination thereof, the signal redistribution subsystem 120 implements a configurable variety of compensation mechanisms. More specifically, the signal redistribution subsystem 120 may be configured to leverage the open earbud 160 and/or the closed earbud 170 to replace any portion of the signal energy lost as the open earbud 160 transforms the open earbud signal 145 to sounds that are received by the user. The signal redistribution subsystem 120 may perform compensation in any technically feasible fashion. For example and without limitation, in some embodiments, the signal redistribution subsystem 120 may perform a variety of equalization and repanning operations.

As also shown in FIG. 1, the signal redistribution subsystem 120 includes, without limitation, a compensation unit 130, an open earbud mixing unit 140, and a closed earbud mixing unit 150. To compensate for the typically frequency-dependent attenuation associated with the open earbud 160, the signal redistribution subsystem 120 performs compensation operations in a frequency-dependent fashion. In alternate embodiments, without limitation, the signal redistribution subsystem 120 may not differentiate between frequency components and may instead apply signal compensation on a more granular basis.

In operation the compensation unit 130 splits the components of the open earbud target signal 105 into signal partitions, where each signal partition is associated with a separate frequency band. Subsequently, for each of the signal partitions, based on the signal energy loss associated with delivery of the included frequencies via the open earbud 160, the compensation unit 130 generates an open earbud compensated signal partition 133 and a closed earbud compensation signal partition 135. Together, the open earbud compensated signal partitions 133 and the closed earbud compensation signal partitions 135 enable the user to receive a listening experience that is similar to the listening experience specified by the open earbud target signal 105.

To provide this target listening experience, the compensation unit 130 tailors the open earbud compensated signal partitions 133 to supplant the open earbud target signal 105 and the closed earbud compensation signal partitions 135 to supplement the listening experience provided by the open earbud 160 using the closed earbud 170. Accordingly, the open earbud mixing unit 140 combines the open earbud compensated signal partitions 133 to form the open earbud signal 145. By contrast, the closed earbud mixing unit 150 combines the closed earbud compensation signal partitions 135 with the closed earbud target signal 115. Such a combination configures the closed earbud 170 to supplement the listening experience received via the open earbud 160 without compromising the listening experience specified by the closed earbud target signal 115.

Figure 2:
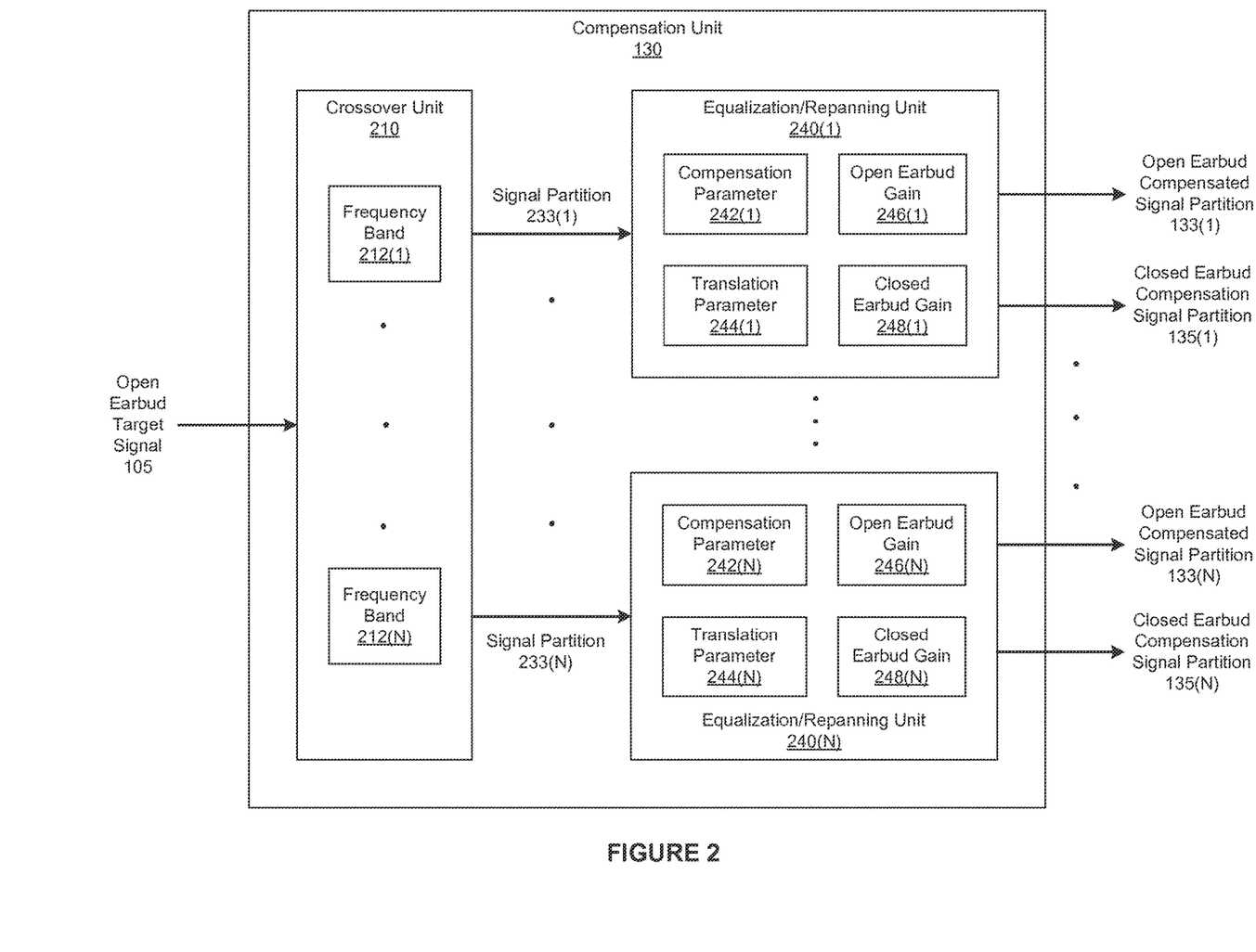
FIG. 2 is a more detailed illustration of the compensation unit of FIG. 1, according to various embodiments.

FIG. 2 is a more detailed illustration of the compensation unit 130 of FIG. 1, according to various embodiments. As shown, the compensation unit 130 includes, without limitation, a crossover unit 210 and one or more equalization/repanning units 240. In alternate embodiments, any number of units may provide the functionality included in the crossover unit 210 and/or the equalization/repanning units 240, in any combination.

Upon receiving the open earbud target signal 105, the crossover unit 210 splits the open earbud target signal 105 into one or more signal partitions 233. Each of the signal partitions 233 is associated with a frequency band 212, and the crossover unit 210 ensures that the signal partition 233(i) includes the components of the open earbud target signal 105 that are included in the frequency band 212(i). Together, the signal partitions 233(1) through 233(N) include all the components of the open earbud target signal 105. The number of frequency bands 212 and the distribution of frequencies between the frequency bands 212 may be determined in any technically feasible fashion. In general, the signal redistribution subsystem 120 is configured such that the frequency bands 212 are consistent with both the frequency-dependent signal attenuation associated with the open earbud 160 and the compensation that the headphone system 100 is designed to provide.

The crossover unit 210 may be implemented in any technically feasible fashion. For example, and without limitation, in a software implementation, the crossover unit 210 could be an application executed by a processing unit. Alternatively, and without limitation, in a hardware implementation, the crossover unit 210 could include any number and combination of digital signal processing units, such as high-pass filters, band-pass filters, low-pass filters, shelf filters, filterbank, etc.

After the crossover unit 210 subdivides the open earbud target signal 105, the compensation unit 130 routes each of the signal partitions 233(i) to an associated equalization/repanning unit 240(i). As shown, each of the equalization/repanning units 240 includes a compensation parameter 242, a translation parameter 244, and open earbud gain 246, and a closed earbud gain 248. The compensation parameter 242 and the translation parameter 244 customize the operation of the equalization/repanning unit 240 and may be set or determined in any technically feasible fashion.

The compensation parameter 242(i) specifies the amount of overall compensation that the equalization/repanning unit 240(i) generates for the signal partition 233(i) (i.e., the total gain that the equalization/repanning unit 240(i) applies to the signal partition 233(i)). The translation parameter 244(i) specifies the percentage of this overall compensation that the equalization/repanning unit 240(i) provides via the closed earbud 170 instead of the open earbud 160. In operation, each of the equalization/repanning units 240(i) calculates the open earbud gain 246(i) and the closed earbud gain 248(i) based on the compensation parameter 242(i) and the translation parameter 244(i).

In general, the semantics and values of the compensation parameters 242 and the translation parameters 244 may be determined in any consistent and technically feasible fashion. In some embodiments, without limitation, the compensation parameter 242(i) may be expressed in terms of a transfer function $H_{open}$ that reflects the response of the open earbud 160 relative to the closed earbud 170. In other embodiments, without limitation, the compensation parameters 242 and the translation parameters 244 may be omitted and the equalization/repanning unit 240(i) may determine the open earbud gain 246(i) and the closed earbud gain 248(i) in any technically feasible fashion that reflects the processing of the open earbud target signal 105 to provide a desired listening experience.

Upon receiving the signal partition 233(i), the equalization/repanning unit 240(i) applies the open earbud gain 246(1) to the signal partition 233(1) to create the open earbud compensated signal partition 133(i). Similarly, the equalization/repanning unit 240(i) applies the closed earbud gain 248(i) to the signal partition 233(i) to create the closed earbud compensation signal partition 135(i). The equalization/repanning unit 240(i) may apply the open earbud gain 246(i) and the closed earbud gain 248(i) in any technically feasible fashion, such as performing one or more signal amplification operations.

The compensation parameters 242 and the translation parameter 244 included in the equalization/repanning units 240 may be set independently. Consequently, the compensation units 130 may be configured to provide compensation that is customized for each of the frequency bands 212 via the open earbud compensated signal partitions 133 and the closed earbud compensation signal partitions 135. In general, the compensation provided by each of the equalization/repanning units 240 ranges from none (i.e., passing through the received signal partition 233 without alteration) to full compensation. As used herein, providing "full compensation" refers to providing a listening experience substantially similar to one that would be provided were the user to receive both the open ear bud target signal 105 and the closed earbud target signal 115 via closed earbuds (i.e., the closed earbud 170 and a second closed earbud).

Optimizing Sound Delivered Via Bimodally Fitting Earbuds

Figure 3:
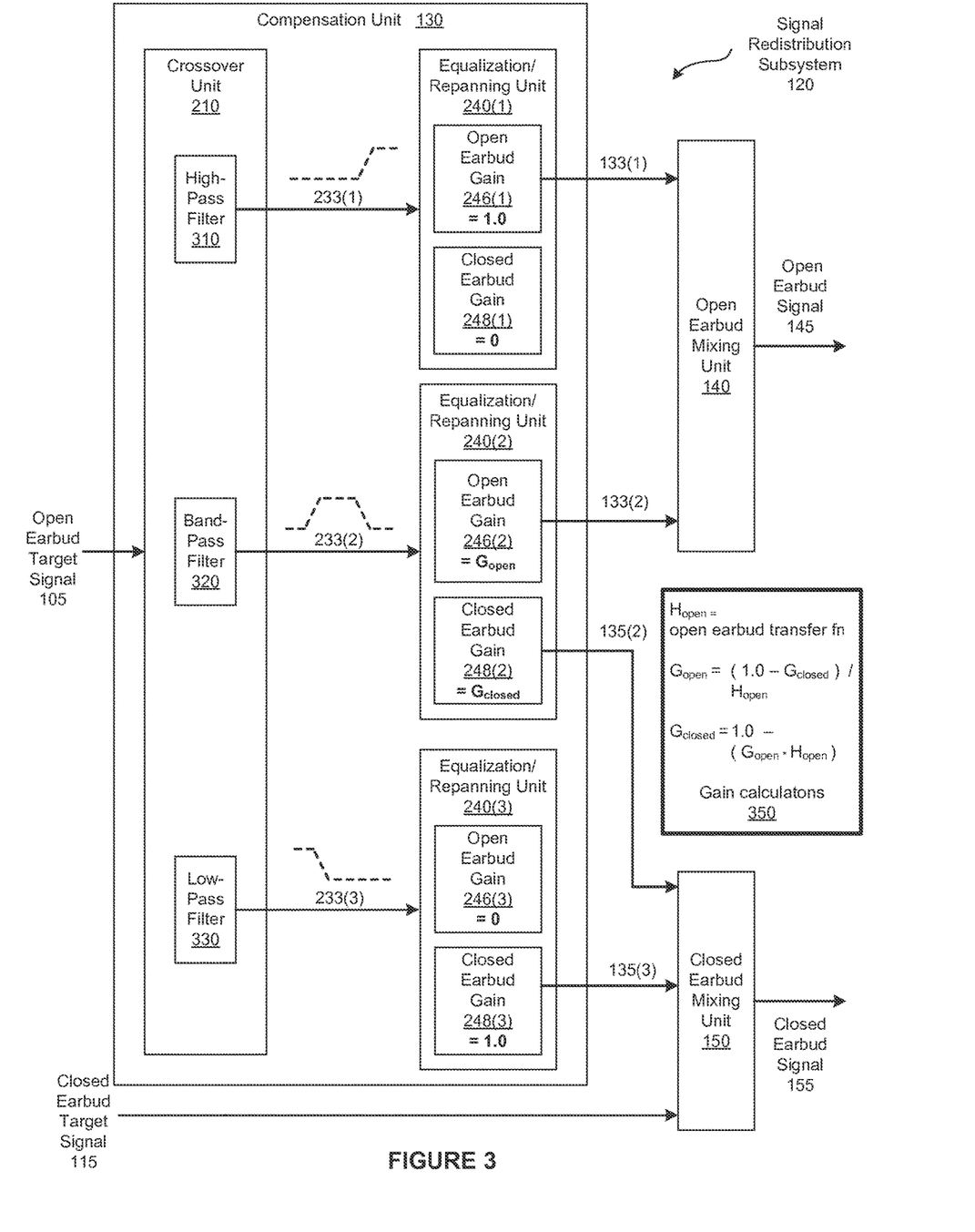
FIG. 3 illustrates the signal redistribution subsystem of FIG. 1 configured to mitigate sound energy losses associated with an open earbud, according to various embodiments.

FIG. 3 illustrates the signal redistribution subsystem 120 of FIG. 1 configured to mitigate sound energy losses associated with the open earbud 160, according to various embodiments. As shown, the signal redistribution subsystem 120 is configured to independently process three separate frequency bands (a high frequency band, a middle frequency band, and a low frequency band) and then perform compensation operations that are tailored to each frequency band.

The signal redistribution subsystem 120 may be configured as shown in any technically feasible fashion. For example, and without limitation, in some embodiments each equalization/repanning unit 240(i) may be configured via the compensation parameter 242(i) and the translation parameter 244(i) as described in FIG. 2. In other embodiments, without limitation, each equalization/repanning unit 240(i) may omit the compensation parameter 242(i) and the translation parameters 244(i) and reflect the desired equalization and/or translation directly via the open earbud gain 246i( ) and the closed earbud gain 248(i).

As shown, the crossover unit 210 includes, without limitation, a high-pass filter 310, a band-pass filter 320, and a low-pass filter 330. In alternate embodiments, the crossover unit 210 may include any number and type of filters and/or the filters may be replaced with any other mechanism for extracting signal components. Upon receiving the open earbud target signal 105, the high-pass filter 310, the band-pass filter 320, and the low-pass filter 330 work together to divide the signal components of the open earbud target signal 105 into the signal partitions 233(1), 233(2), and 233(3).

The signal partition 233(1) includes the relatively high frequency components of the open earbud target signal 105. In operation, the equalization/repanning unit 240(1) processes the signal partition 233(1). Because the signal energy loss of high frequency components via the open earbud 160 is relatively low and typically does not compromise the listening experience, the equalization/repanning unit 240(1) is configured to "pass through" the signal partition 233(1).

More specifically, the equalization/repanning unit 240(1) includes a value of "1" or "unity" for the open earbud gain 246(1) and a value of "0" for the closed earbud gain 248(1). Accordingly, the equalization/repanning unit 240(1) does not perform any equalization or repanning operations and does not target any portion of the signal partition 233(1) for delivery via the closed earbud 170. Consequently, the open earbud compensated signal partition 133(1) matches the signal partition 233(1) and the equalization/repanning unit 240(1) does not generate a closed earbud compensation signal partition. Since the equalization/repanning unit 240(1) does not alter the signal partition 233(1), in alternate embodiments, without limitation, the equalization/repanning unit 240(1) may be omitted from the compensation unit 130.

The equalization/repanning unit 240(2) processes the signal partition 233(2)—the "middle" frequency components of the open earbud target signal 105. Because the signal energy loss of middle frequency components via the open earbud 160 may noticeably compromise the listening experience, the equalization/repanning unit 240(2) is configured to mitigate the signal energy loss via both equalization and repanning operations.

The configuration of the equalization/repanning unit 240(2) is specified by the open earbud gain 246(2) "$G_{open}$" and the closed earbud gain 248(2) "$G_{closed}$." The equalization/repanning unit 240(2) applies the open earbud gain 246(2) to the signal partition 233(2) to generate the open earbud compensated signal partition 133(2) and applies the closed earbud gain 248(2) to the signal partition 233(2) to generate the closed earbud compensation signal partition 135(2). In this fashion, the equalization/repanning unit 240(2) leverages both the open earbud 160 and the closed earbud 170 to produce a sound experience for the user that is acceptably similar to the ideal sound experience specified by the signal partition 233(2).

Gain calculations 250 illustrate the relationship of the values $G_{open}$ and $G_{closed}$ to each other and to a transfer function $H_{open}$ that reflects the response of the open earbud 160 relative to the closed earbud 170. In alternate embodiments, the values $G_{open}$ and $G_{closed}$ may be determined in any technically feasible fashion. Further, the values $G_{open}$ and $G_{closed}$ may be calculated off-line as part of the design of the equalization/repanning unit 240(2) or dynamically in response to user input, such as values of the compensation parameter 242(2) and the translation parameter 244(2).

The signal partition 233(3) includes the low frequency components of the open earbud target signal 105, and the equalization/repanning unit 240(3) processes the signal partition 233(3). Because the signal energy loss of low frequency components via the open earbud 160 is relatively high and typically noticeably compromises the listening experience, the equalization/repanning unit 240(3) is configured to repan (i.e., redirect) the signal partition 233(3) from the open earbud 160 to the closed earbud 170.

Accordingly, the equalization/repanning unit 240(3) includes a value of "0" for the open earbud gain 246(3) and a value of "1" for the closed earbud gain 248(3). Upon receiving the signal partition 233(3), the equalization/repanning unit 240(3) does not perform any equalization operations, but retargets the signal partition 233(3) for delivery via the closed earbud 170. Consequently, the equalization/repanning unit 240(3) does not generate an open earbud compensated signal partition, and the equalization/repanning unit 240(3) ensures that the closed earbud compensation signal partition 135(3) matches the signal partition 233(3). In this fashion, the equalization/repanning unit 240(3) leverages the closed earbud 170 to fully preserve the bass components of the open earbud target signal 105.

The open earbud mixing unit 140 receives the open earbud compensated signal partitions 133(1) and 133(2). The open earbud mixing unit 140 then performs compositing operations that generate the open earbud signal 145 based on the open earbud compensated signal partitions 133(1) and 133(2). The open earbud mixing unit 140 neither receives nor processes any portion of the signal partition 233 (the bass components of the open earbud target signal 105).

In a complementary fashion, the closed earbud mixing unit 150 receives the closed earbud compensation signal partitions 135(2) and 135(3). The closed earbud mixing unit 150 also receives the closed earbud target signal 115. The closed earbud mixing unit 150 then performs compositing operations that generate the closed earbud signal 155 based on the open earbud compensation signal partitions 135(2) and 135(3) and the closed earbud target signal 115. In this fashion, the closed earbud mixing unit 150 supplements the closed earbud target signal 115 with a portion of the middle frequency components and all the low frequency components included in the open earbud target signal 105.

Upon delivery of the open earbud signal 145 via the open earbud 160 and the closed earbud signal 155 via the closed earbud 170, the headphone system 100 provides a listening experience that optimally reflects the open earbud target signal 105 and the closed earbud target signal 115. Importantly, the listening experience is substantially similar to a listening experience that would be provided via a conventional headset with two closed earbuds, but the headphone system 100 also allows the user to hear outside sounds, such as traffic, via the open earbud 160.

In alternate embodiments, the compensation unit 130 may be configured to divide the open target earbud signal 105 into any number of signal partitions 133. Further, and without limitation, in some embodiments, the compensation unit 130 may not divide the target earbud signal 105 and may process the target earbud signal 105 as a single signal partition 133. In such embodiments, the crossover unit 210 may be omitted and replaced with a filterbank.

In various embodiments, each of the equalization/repanning units 240 may be independently configured to generate any amount of compensation for signal energy lost via the open earbud 160 for transmission by the open earbud 160, the closed earbud 170, or any combination thereof. For example, and without limitation, in some embodiments, the equalization/repanning unit 240($i$) may be configured to provide compensation via the open earbud 160 but not the closed earbud 170. In such embodiments, the equalization/repanning unit 240($i$) would not produce the closed earbud compensation signal partition 135($i$). Further, in some embodiments, without limitation, the equalization/repanning unit 240($i$) may be configured to provide compensation via the closed earbud 170 but not the open earbud 160. In such embodiments, the equalization/repanning unit 240($i$) would relay the signal partition 233($i$) to the open earbud 160 without alteration, but would generate the closed earbud compensation signal partition 135($i$) to compensate for signal energy lost via the open earbud 160.

In alternate embodiments, the functionality included in the signal redistribution subsystem 120 may be distributed between any number and types of units. For example, and without limitation, multiple equalization/repanning units 240 may be combined into a single equalization/repanning unit. Further, the signal redistribution subsystem 120 may be implemented in any technically feasible fashion using any combination of software, firmware, and hardware. For example, and without limitation, in an entirely software implementation, the signal redistribution subsystem 120 could be an application executed by a processing unit.

Figure 4:
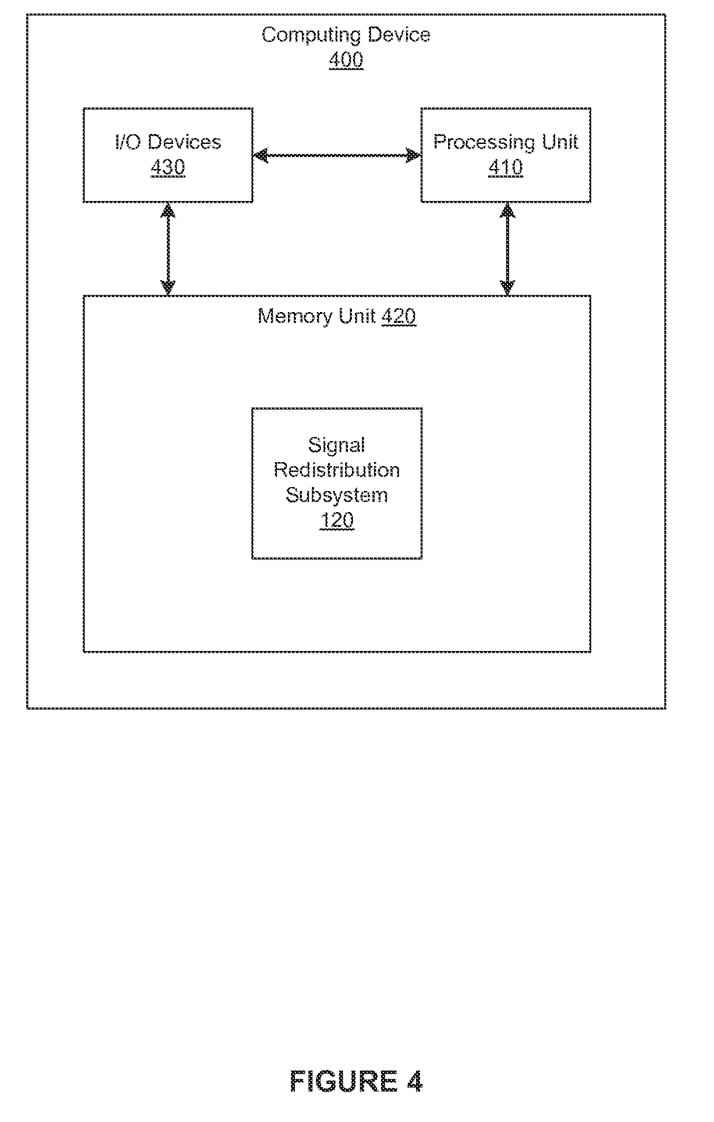
FIG. 4 illustrates a computing device within which one or more aspects of the signal redistribution subsystem of FIG. 1 may be implemented, according to various embodiments.

FIG. 4 illustrates a computing device 400 within which one or more aspects of the signal redistribution subsystem 120 of FIG. 1 may be implemented, according to various embodiments. The computing device 400 may be any type of device capable of executing application programs including, and without limitation, application programs included in the signal redistribution subsystem 120. As shown, the computing device 400 includes, without limitation, a processing unit 410, a memory unit 420, and input/output (I/O) devices 430.

The processing unit 410 may be implemented as a central processing unit (CPU), digital signal processing unit (DSP), graphics processor unit (GPU), and so forth. Among other things, and without limitation, the processing unit 410 executes one or more application programs that implement the signal redistribution subsystem 120 and are stored in the memory unit 420. The memory unit 420 may include a memory module or collection of memory modules that provide storage space accessible by the processing unit 410. The I/O devices 430 may include input devices, output devices, and devices capable of both receiving input and providing output and may enable any communication protocols. For example, and without limitation, the I/O devices 430 may include Smart WiFi and Bluetooth interfaces.

In alternate embodiments, the computing device 400 may be replaced and/or supplemented with any number of signal processing components that facilitate the operation of the earphone system 100. For example, and without limitation, instead of the computing device 400, the earphone system 100 may include components that implement a variety of filters, digital to analog converters, dynamic amplifiers, etc. that are configured to implement the functionality included in the signal redistribution subsystem 120.

The computing device 400 may be incorporated into the earphone system 100 of FIG. 1 in any technically feasible fashion and as any number of discrete or integrated units. For example, each of the processing unit 410, the memory unit 420, and the I/O devices 430 may be embedded in or mounted on the open earbud 160, the closed earbud 170, and/or a physical connection between the open earbud 160 and the closed earbud 170. In some embodiments, without limitation, the computing device 400 may be implemented as a stand-alone chip or as part of a more comprehensive solution that is implemented as an application-specific integrated circuit (ASIC), a system-on-a-chip (SoC), and so forth.

In alternate embodiments, any portion, including all, of the computing device 400 may be external to the physical earphones (i.e., the portions of the earphone system 100 that are worn by the user). For example and without limitation, the computing device 400 may be a laptop, a tablet, a smartphone, or the like that executes the signal redistribution subsystem 120 and transmits data to the physical earphones. In general, the embodiments disclosed herein contemplate any technically feasible system configured to implement the functionality included in various components of the signal redistribution subsystem 120 in any combination.

Figure 5:
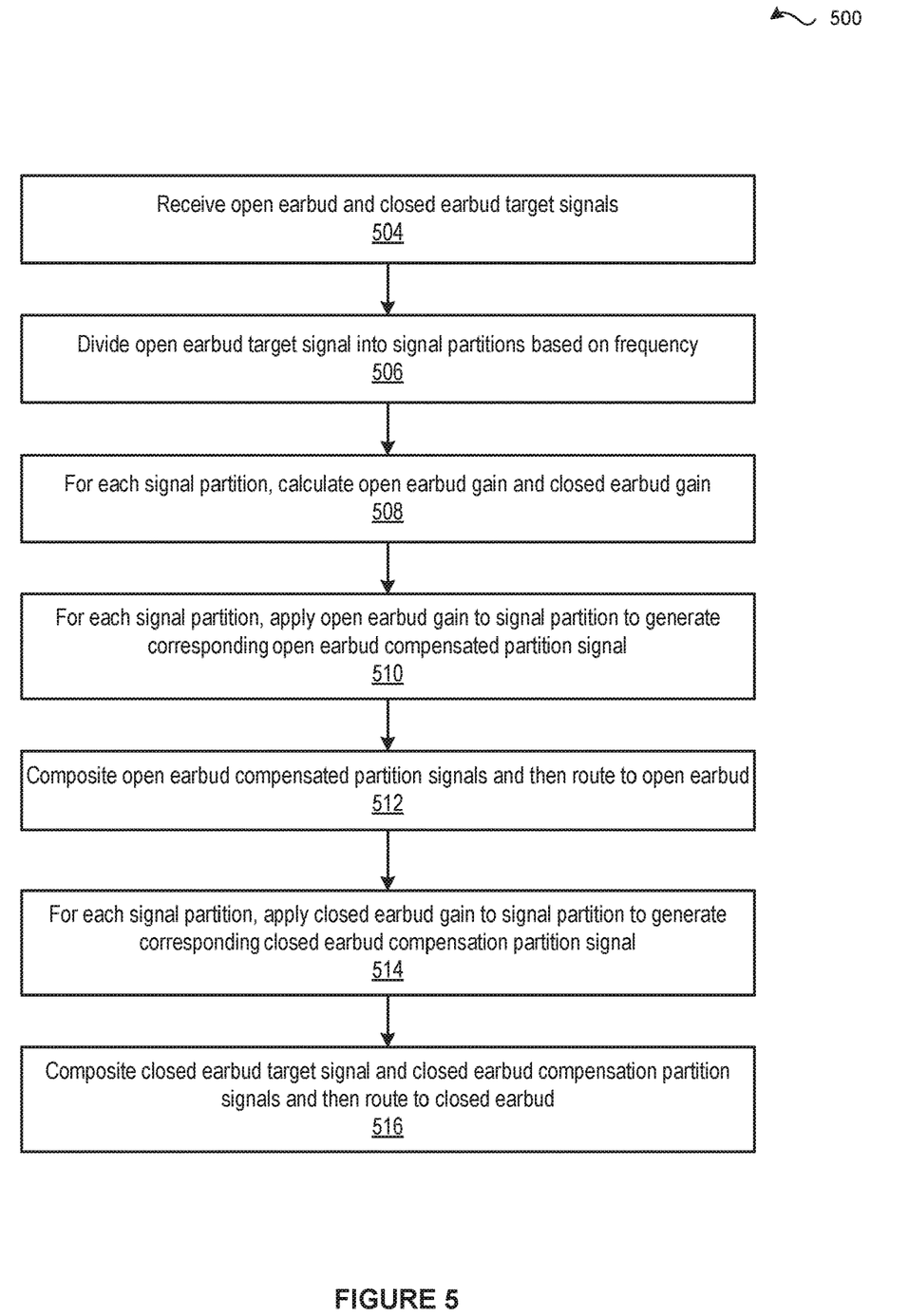
FIG. 5 is a flow diagram of method steps for delivering sound via earphones that include bimodally fitting earbuds, according to various embodiments.

FIG. 5 is a flow diagram of method steps for delivering sound via earphones that include befitted earbuds, according to various embodiments. Although the method steps are described in conjunction with the systems of FIGS. 1-4, persons skilled in the art will understand that any system configured to implement the method steps, in any order, falls within the scope of the various embodiments.

As shown, a method 500 begins at step 504, where the earphone system 100 receive the open earbud target signal 105 and the closed earbud target signal 115. The earphone system 100 may receive the open earbud target signal 105 and the closed earbud target signal 115 in any technically feasible fashion. For example, the earphone system 100 may include a wireless receiver that receives transmissions from an MP3 player. At step 506, the crossover unit 210 divides the open earbud target signal 105 into the signal partitions 233 based on frequency. More specifically, each of the signal partitions 233 is associated with a separate frequency band 212, and the crossover unit 210 distributes the components of the open earbud target signal 105 to the signal partitions 233 according to the frequency of the components.

At step 508, for each of the signal partitions 233($i$), the signal equalizing/repanning unit 240($i$) calculates the open earbud gain 246($i$) and the closed earbud gain(i). More specifically, signal equalizing/repanning unit 240($i$) determines the open earbud gain 246($i$) and the closed earbud gain(i) based on the compensation parameter 242(i) and the translation parameter 244(i). For example, and without limitation, the crossover unit 210 could divide the open earbud target signal 105 into the signal partitions 233 of "high," "medium," and "low." In such a scenario, three separate signal equalization/repanning units 240 would calculate three separate open earbud gains 246 and three separate closed earbud gains 248 based on three compensation parameters 242 and three translation parameters 244.

The compensation parameters 242 and the translation parameters 244 may be any values that are consistent with the desired acoustic characteristics of the earphone system 100. For example, and without limitation, the compensation parameter 242(1) could be zero and the translation parameter 244(1) could be 0.0 to specify, respectively, no "high" frequency compensation and no redistribution of "high" frequencies from the open earbud 160 to the closed earbud 170. Further, and without limitation, the compensation parameter 242(1) could be 1.0 and the translation parameter 244(3) could be 1.0 to provide full "low" frequency compensation via the closed earbud 170. In such a configuration, the signal redistribution subsystem 120 could redirect all the low frequencies from the open earbud 160 to the closed earbud 170, thereby providing a sound experience that is substantially similar to the sound experience that would typically be provided by conventional headphones with two closed earbuds.

In some embodiments, without limitation, the compensation parameters 242 may be based signal energy lost via the open earbud 160. For example, and without limitation, the compensation parameter 242 could be the reciprocal of the open earbud transfer function that represents the response to a signal delivered via the open earbud 160 versus the closed earbud 170. In general, the pairs of the compensation parameters 242 and the translation parameters 244 across the various frequency bands of the signal partitions 233 tailor the performance characteristic of the earphone system 100 to provide the desired listening experience. In alternate embodiments, without limitation, the compensation parameters 242 and the translation parameters 244 are omitted and the open earbud gain 246 and the closed earbud gain 248 are directly configured to control the listening experience.

At step 510, for each of the signal partitions 233(i), the signal equalizing/repanning unit 240(i) applies the open earbud gain 246(i) to the signal partition 233(i), thereby generating the open earbud compensated signal partition 133(1). Notably, the open earbud compensated signal partition 133(i) represents the strategically modified (e.g., amplified) signal components within the frequency band 212(i) in the open earbud target signal 105 that are to be delivered via the open earbud 160.

In some embodiments, without limitation, the equalization/repanning unit 240(i) may be configured to provide compensation via the closed earbud 170 but not the open earbud 160. In such embodiments, the equalization/repanning unit 240(i) would relay the signal partition 233(i) to the open earbud 160 without alteration. If all the equalization/repanning units 240 were configured to provide compensation using the closed earbud 170 but not the open earbud 160, then step 510 could be omitted.

At step 512, the open earbud mixing unit 140 combines the open earbud compensated signal partitions 133 to create the open earbud signal 145. Subsequently, the open earbud mixing unit 140 delivers the open earbud signal 145 to the speakers included in the open earbud 160 for delivery as sounds to the proximately located ear of the user. In this fashion, the earphone system 100 conveys a listening experience via the open earbud 160 that may compensate for any portion of the signal loss attributable to the open design of the open earbuds 160.

At step 514, for each of the signal partitions 233(i), the signal equalizing/repanning unit 240(i) applies the closed earbud gain 248(i) to the signal partition 233(i), thereby generating the closed earbud compensation signal partition 135(i). In a complementary fashion to the open earbud compensated signal partition 133(i), the closed earbud compensated signal partition 133(i) represents processed signal components within the frequency band 212(i) in the open earbud target signal 105 that are to be delivered via the closed earbud 170.

In alternate embodiments, the equalization/repanning unit 240(i) may be configured to provide compensation via the open earbud 160 but not the closed earbud 170. In such embodiments, the equalization/repanning unit 240(i) would not produce the closed earbud compensation signal partition 135(i). If all the equalization/repanning units 240 were configured to provide compensation using the closed earbud 170 but not the open earbud 160, then step 514 could be omitted.

At step 516, the closed earbud mixing unit 150 combines the entire frequency range of the closed earbud target signal 115 with the closed earbud compensation signal partitions 135 to create the closed earbud signal 155. In this fashion, the closed earbud mixing unit 150 supplements the closed earbud target signal 115 with processed portions of the open earbud target signal 105. The closed earbud mixing unit 150 then delivers this closed earbud signal 155 to the speakers included in the closed earbud 170 for delivery as sound to the proximately located ear of the user. In this fashion, the closed earbud 170 provides a listening experience as specified by the closed earbud target signal 155 that is, optionally, supplemented to compensate for portions of the signal loss attributable to the open design of the open earbud 160. Together, the open earbud 160 and the closed earbud 170 provide a comprehensive listening experience that mitigates signal degradation associated with the open earbuds 160, without isolating the user from the outside environment.

In sum, the disclosed techniques may be used to optimize the personal listening experience of users. Notably, earphones leverage a signal redistribution subsystem, an open earbud, and a closed earbud to deliver high-fidelity sounds directly to the ears of users without undesirably isolating the user from external sounds. In operation, the signal redistribution subsystem analyzes an open earbud signal intended for transmission via the open earbud and performs one or more equalization and/or panning operations that compensate for signal degradation attributable to the design of the open earbud.

First, the signal redistribution subsystem divides the open earbud signal based on frequency—creating a low frequency signal partition, a middle frequency signal partition, and a high frequency signal partition. Because the sound loss associated with an open earbud inversely correlates to the frequency of the signal delivered via the open earbud, the signal redistribution subsystem retargets the low frequency signal partition for delivery via the closed earbud (bypassing the low frequency signal corruption associated with the open earbud). The signal redistribution subsystem then divides the middle frequency signal, targeting a portion for delivery via the open earbud and the remaining for delivering via the closed earbud. As part of dividing the middle frequency signal partition, the signal redistribution subsystem applies gains to each portion that, together, compensate for signal energy lost via the open earbud. Finally, the signal redistribution subsystem routes the high frequency signal partition for delivery via the open earbud.

At least one advantage of the disclosed approach is that it provides optimized, flexible listening experiences for users. By exploiting the advantages of both open earbuds and closed earbuds, the disclosed earphones enable tradeoffs between sound quality and environmental isolation that are not supported by conventional earphones. Notably, the user may optimally perform activities, such as bicycling, that benefit from exposure to external noises without unacceptable sacrificing the fidelity of sound delivered via the earphones. More specifically, a bicyclist may wear earphones with an open earbud inserted in the ear that is closer to the road and a closed earbud inserted in the ear that is further from the road. In operation, such earphones expose the user to traffic noises via the open earbud while delivering higher fidelity sound than is typically delivered via conventional earphones that include two open earbuds.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The various embodiments have been described above with reference to specific embodiments. Persons of ordinary skill in the art, however, will understand that various modifications and changes may be made thereto without departing from the broader spirit and scope of the various embodiments as set forth in the appended claims. For example, and without limitation, although many of the descriptions herein refer to specific types of audiovisual equipment and sensors, persons skilled in the art will appreciate that the systems and techniques described herein are applicable to other types of performance output devices (e.g., lasers, fog machines, etc.) and sensors. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. An audio device, comprising:
a first earbud configured to create a substantially open sound chamber around a first ear of a user;
a second earbud configured to create a substantially closed sound chamber around a second ear of the user; and
a signal redistribution subsystem that is coupled to both the first earbud and the second earbud and configured to:
perform one or more first compensation operations on a first audio input signal that is targeted for output via a first speaker of the first earbud, wherein the one or more first compensation operations:
produce a first compensated signal that mitigates leakage of sound generated by a speaker of the first earbud into a surrounding environment due to the substantially open sound chamber, divide the first audio input signal into a first partition and a second partition based on frequency, and perform a first repanning operation to retarget the second partition for output via a second speaker of the second earbud;

transmit the first compensated signal to the first earbud; and transmit to the second earbud a second audio input signal that is targeted for output via the second speaker of the second earbud, wherein the second audio input signal comprises at least one of an uncompensated audio input signal and a second compensated signal, the second compensated signal being generated via one or more second compensation operations that are based on the second earbud being configured to create the substantially closed sound chamber around the second ear of the user.

2. The audio device of claim 1, wherein the one or more first compensation operations include an equalization operation.

3. The audio device of claim 1, wherein the first repanning operation retargets the second partition by removing the frequency components included in the second partition from the first compensated signal and adding the frequency components included in the second partition to the second audio input signal.

4. The audio device of claim 1, wherein the one or more first compensation operations divide the first audio input signal by applying at least one of a high-pass filter, a band-pass filter, a low-pass filter, and a shelf filter to the first audio input signal to produce one or more frequency bands.

5. The audio device of claim 1, wherein the one or more first compensation operations comprise:

performing an equalization operation to increase a gain associated with the first partition, wherein the equalization operation generates the first compensated signal.

6. The audio device of claim 5, wherein the equalization operation increases the gain associated with the first partition by amplifying the level of the first partition to compensate for a difference between a response associated with the first earbud and a response associated with the second earbud.

7. The audio device of claim 1, wherein the dividing operation further divides the first audio input signal into a third partition based on frequency, and wherein the one or more first compensation operations comprise:

performing a first equalization operation to increase a gain associated with the first partition, wherein the first equalization operation generates a first compensated signal partition;

performing a second equalization operation to increase the gain associated with a remaining portion of the second partition, wherein the second equalization operation generates a second compensated signal partition;

combining the first compensated signal partition and the second compensated signal partition to produce the first compensated signal; and performing a second repanning operation to retarget the third partition for output via the second speaker of the second earbud.

8. A computer-implemented method for configuring an audio device for operation, wherein the audio device includes an open earbud and a closed earbud, the method comprising:

performing one or more first compensation operations on a first audio input signal that is targeted for output via a first speaker of the open earbud, wherein the one or more first compensation operations:

produce a first compensated signal that mitigates leakage of sound generated by a speaker of the open earbud into a surrounding environment;

divide the first audio input signal into a first partition and a second partition based on frequency, and perform a first repanning operation to retarget the second partition for output via a second speaker of the closed earbud;

transmitting the first compensated signal to the open earbud; and transmitting to the closed earbud a second audio input signal that is targeted for output via the second speaker of the closed earbud, wherein the second audio input signal comprises at least one of an uncompensated audio input signal and a second compensated signal, the second compensated signal being generated via one or more second compensation operations that are based on the second earbud being configured to create the substantially closed sound chamber around the second ear of the user.

9. The method of claim 8, wherein the one or more first compensation operations include at least one of a translation operation and an amplification operation.

10. The method of claim 8, wherein the first partition includes higher frequencies than the second partition.

11. The method of claim 10, wherein the first repanning operation retargets the second partition by removing the frequency components included in the second partition from the first compensated signal and adding the frequency components included in the second partition to the second audio input signal.

12. The method of claim 8, wherein the one or more first compensation operations comprise:

performing an equalization operation to increase a gain associated with the first partition, wherein the equalization operation generates the first compensated signal.

13. The method of claim 12, wherein the equalization operation increases the gain associated with the first partition by amplifying the level of the first partition based on a transfer function that represents a difference between a response associated with the open earbud and a response associated with the closed earbud.

14. The method of claim 8, wherein the dividing operation further divides the first audio input signal into a third partition based on frequency, and wherein the one or more first compensation operations comprise:

performing a first equalization operation to increase a gain associated with the first partition, wherein the first equalization operation generates a first compensated signal partition;

performing a second equalization operation to increase the gain associated with a remaining portion of the second partition, wherein the second equalization operation generates a second compensated signal partition;

combining the first compensated signal partition and the second compensated signal partition to produce the first compensated signal; and performing a second repanning operation to retarget the third partition for output via the second speaker of the closed earbud.

15. A non-transitory, computer-readable storage medium including instructions that, when executed by a processor, cause the processor to configure an audio device for operation by performing the steps of:
- performing one or more first compensation operations on a first audio input signal that is targeted for output via a first speaker of an open earbud included in the audio device, wherein the one or more first compensation operations:
- produce a first compensated signal that mitigates leakage of sound generated by a speaker of the open earbud into a surrounding environment, divide the first audio input signal into a first partition and a second partition based on frequency, and perform a first repanning operation to retarget the second partition for output via a second speaker of a closed earbud;
- transmitting the first compensated signal to the open earbud; and
- transmitting to the closed earbud a second audio input signal that is targeted for output via the second speaker of the closed earbud, wherein the closed earbud is included in the audio device, wherein the second audio input signal comprises at least one of an uncompensated audio input signal and a second compensated signal, the second compensated signal being generated via one or more second compensation operations that are based on the second earbud being configured to create the substantially closed sound chamber around the second ear of the user.

16. The non-transitory computer-readable storage medium of claim 15, wherein the one or more first compensation operations include an equalization operation.

17. The non-transitory computer-readable storage medium of claim 15,
wherein the first partition includes higher frequencies than the second partition.

18. The non-transitory computer-readable storage medium of claim 15, wherein the one or more first compensation operations comprise:
- performing a first equalization operation to increase a gain associated with the first partition, wherein the first equalization operation generates the first compensated signal;
- performing a second equalization operation to increase a gain associated with the second partition, wherein the second equalization operation generates a first frequency band,
- wherein the first repanning operation further retargets the first frequency band for output via the closed earbud.

19. The non-transitory computer-readable storage medium of claim 15, wherein the dividing operation further divides the first audio input signal into a third partition based on frequency, and wherein the one or more first compensation operations comprise:
- performing a first equalization operation to increase a gain associated with the first partition, wherein the first equalization operation generates a first compensated signal partition;
- performing a second equalization operation to increase the gain associated with a remaining portion of the second partition, wherein the second equalization operation generates a second compensated signal partition;
- combining the first compensated signal partition and the second compensated signal partition to produce the first compensated signal; and
- performing a second repanning operation to retarget the third partition for output via the second speaker of the closed earbud.

* * * * *